US009031839B2

(12) United States Patent
Thorsen et al.

(10) Patent No.: US 9,031,839 B2
(45) Date of Patent: May 12, 2015

(54) CONFERENCE TRANSCRIPTION BASED ON CONFERENCE DATA

(75) Inventors: Tyrone Terry Thorsen, Seattle, WA (US); Alan Darryl Gatzke, Bainbridge Island, WA (US)

(73) Assignee: Cisco Technology, Inc., San Jose, CA (US)

( * ) Notice: Subject to any disclaimer, the term of this patent is extended or adjusted under 35 U.S.C. 154(b) by 356 days.

(21) Appl. No.: 12/958,129

(22) Filed: Dec. 1, 2010

(65) Prior Publication Data

US 2012/0143605 A1   Jun. 7, 2012

(51) Int. Cl.
   *G10L 15/26*     (2006.01)
   *G10L 15/183*    (2013.01)
   *G10L 15/065*    (2013.01)

(52) U.S. Cl.
   CPC .............. *G10L 15/183* (2013.01); *G10L 15/065* (2013.01)

(58) Field of Classification Search
   CPC ..... G10L 15/063; G10L 15/183; G10L 15/18; G10L 15/065; G10L 15/265
   USPC .................................................. 704/235, 260
   See application file for complete search history.

(56) References Cited

U.S. PATENT DOCUMENTS

| | | | |
|---|---|---|---|
| 5,905,773 A | 5/1999 | Wong | |
| 6,510,414 B1 | 1/2003 | Chaves | |
| 6,853,716 B1 | 2/2005 | Shaffer et al. | |
| 7,689,415 B1 | 3/2010 | Jochumson | |
| 7,818,215 B2 | 10/2010 | King et al. | |
| 7,860,717 B2* | 12/2010 | Urhbach et al. | 704/276 |
| 8,255,386 B1 | 8/2012 | Annau et al. | |
| 2005/0055210 A1* | 3/2005 | Venkataraman et al. | 704/255 |
| 2006/0149558 A1* | 7/2006 | Kahn et al. | 704/278 |
| 2007/0208567 A1* | 9/2007 | Amento et al. | 704/270 |
| 2008/0201143 A1* | 8/2008 | Olligschlaeger et al. | 704/235 |
| 2008/0228480 A1* | 9/2008 | Maegawa | 704/235 |
| 2009/0037171 A1* | 2/2009 | McFarland et al. | 704/235 |
| 2009/0049053 A1 | 2/2009 | Barker et al. | |
| 2009/0313017 A1 | 12/2009 | Nakazawa et al. | |
| 2010/0121638 A1* | 5/2010 | Pinson et al. | 704/235 |
| 2010/0241432 A1* | 9/2010 | Michaelis | 704/260 |
| 2010/0250547 A1 | 9/2010 | Grefenstette et al. | |

(Continued)

OTHER PUBLICATIONS

Hazen, T., et al., "Recognition Confidence Scoring for Use in Speech Understanding Systems," *Computer Speech and Language*, 16(1):49-67 (Jan. 2002).

(Continued)

*Primary Examiner* — Jakieda Jackson (57) ABSTRACT

In one implementation, a collaboration server is a conference bridge or other network device configured to host an audio and/or video conference among a plurality of conference participants. The collaboration server sends conference data and a media stream including speech to a speech recognition engine. The conference data may include the conference roster or text extracted from documents or other files shared in the conference. The speech recognition engine updates a default language model according to the conference data and transcribes the speech in the media stream based on the updated language model. In one example, the performance of default language model, the updated language model, or both may be tested using a confidence interval or submitted for approval of the conference participant.

20 Claims, 7 Drawing Sheets

(56) References Cited

U.S. PATENT DOCUMENTS

| | | |
|---|---|---|
| 2010/0251142 A1* | 9/2010 | Geppert et al. ............... 715/758 |
| 2010/0268534 A1* | 10/2010 | Kishan Thambiratnam et al. ............................ 704/235 |
| 2010/0268535 A1* | 10/2010 | Koshinaka .................... 704/236 |
| 2011/0032845 A1* | 2/2011 | Agapi et al. .................. 370/260 |
| 2011/0112833 A1* | 5/2011 | Frankel et al. ................ 704/235 |
| 2011/0270609 A1* | 11/2011 | Jones et al. ................... 704/235 |
| 2012/0108221 A1* | 5/2012 | Thomas et al. ............... 455/415 |
| 2012/0232898 A1* | 9/2012 | Di Fabbrizio et al. ........ 704/235 |

OTHER PUBLICATIONS

Hakkani-Tür, D., et al., "Error Prediction in Spoken Dialog: From Signal-To-Noise Ratio to Semantic Confidence Scores," *IEEE* (2005).

U.S. Appl. No. 12/870,480 titled "Speech Recognition Model," filed Aug. 27, 2010.

U.S. Appl. No. 12/509,797 titled "Method and System for Speech Recognition Using Social Networks," filed Jul. 27, 2009.

U.S. Appl. No. 12/774,054 titled "Training a Transcription System," filed May 5, 2010.

\* cited by examiner

CONFERENCE TRANSCRIPTION BASED ON CONFERENCE DATA

FIELD

The present embodiments relate to speech recognition or speech to text transcriptions.

BACKGROUND

Many meetings or conference calls rely on a designated note taker to capture the meeting notes by hand. Despite the tedious nature of this process, manual transcription remains the most accurate and cost effective solution for the production of meeting transcripts. Automatic (machine only) speech recognition techniques are inexpensive but are plagued by accuracy issues. These problems are exasperated because conference calls typically have technical or specialized jargon, which is often unrecognized by the speech recognition technique. Human assisted transcription services can be more accurate but involve excessive costs. Recent efforts have focused on improving the accuracy of automatic speech recognition techniques.

DETAILED DESCRIPTION

Overview

Speech recognition systems convert speech or audio into text that can be searched. Speech recognition systems use language models that define statistical relationships between words or groups of words. The language models can be specialized to geographic regions, subject matter, or tailored to an individual's actual recorded speech patterns over time. Speech recognition systems may be used to convert the recording of a conference (or stream of the conference in real time) into text so that the content is searchable. Conference data, referred to as metadata, is used to build or modify the language model for the conference. The conference data includes information, other than the audio communication, that is shared during the conference, the title of the conference, the list of participants of the conference, or a document referenced in the conference. The conference data provides context because the conference data includes words that are likely to be used during the conference. Additional context improves the accuracy of the speech to text transcription of the conference.

In one aspect, a method includes receiving conference data from at least one of a plurality of conference participants, sending text associated with the conference data to a speech recognition engine, receiving a plurality of input media streams from the plurality of conference participants, generating an output media stream from the plurality of input media streams, and sending the output media stream to the plurality of conference participants and to the speech recognition engine. The conference data may include a shared material or a conference roster or both.

In a second aspect, an apparatus includes a memory, a controller, and a communication interface. The memory is configured to store conference data received from at least one of a plurality of conference participants. The controller is configured to obtain text based on the conference data and configured to generate an output media stream from a plurality of input media streams received from the plurality of conference participants. The communication interface is configured to send the output media stream and the text to a speech recognition engine.

In a third aspect, a non-transitory computer readable storage medium comprising instructions configured to receive shared data associated with a conference from at least one of a plurality of conference participants, the shared data being other than audio data, extract text from the shared data, update a default language model based on the text, and transcribe at least a portion of a media stream from the conference using the updated language model.

Example Embodiments

Figure 1:
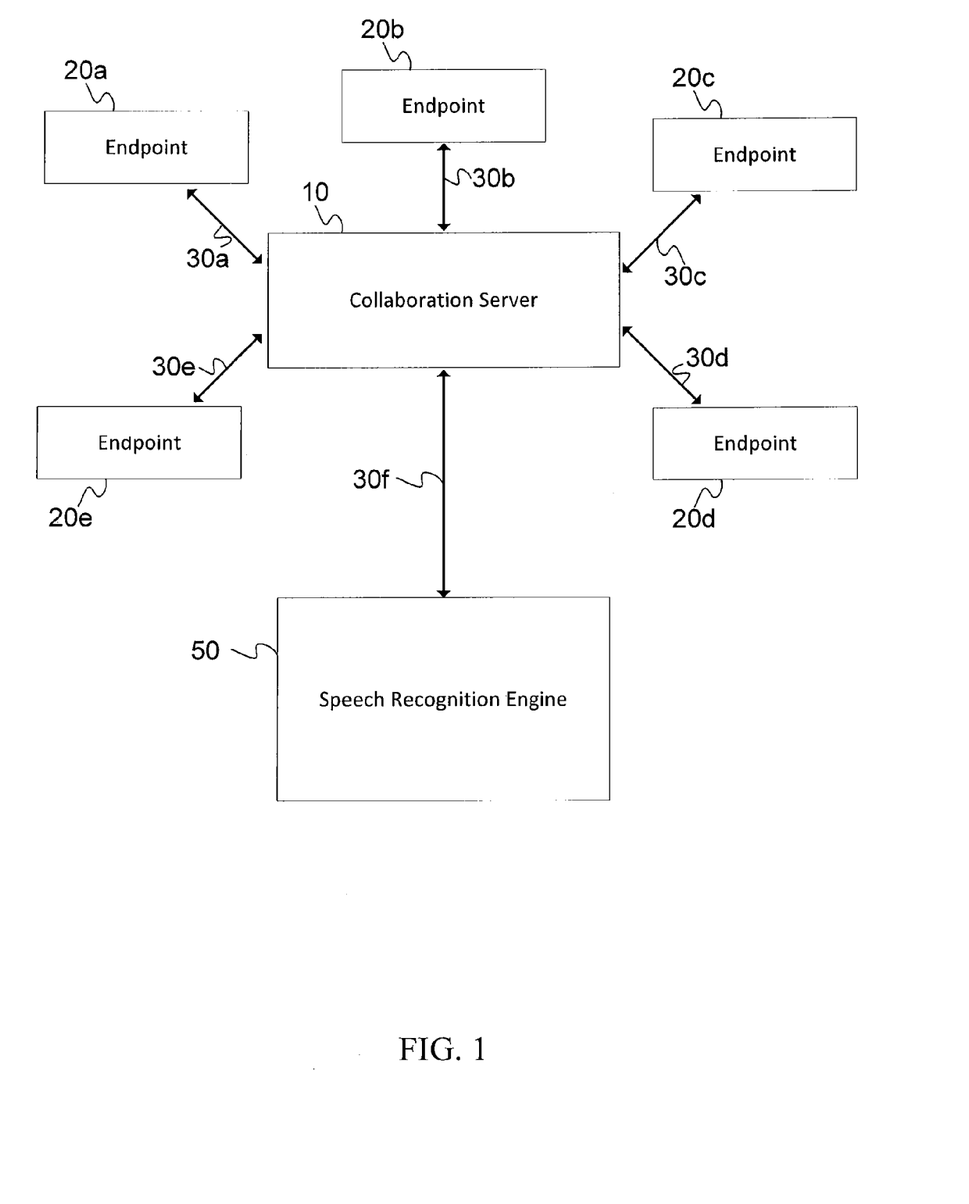
FIG. 1 illustrates an embodiment of a conference system.

FIG. 1 illustrates a network including a speech recognition engine 50 and a collaboration server 10. The collaboration server 10 may be a conference bridge or a multipoint conferencing unit (MCU), or integrated with another network device. The collaboration server 10 is in communication with one or more endpoints 20a-e via communication paths 30a-e. Each of the endpoints 20a-e may be a personal computer, a voice over internet protocol (VoIP) phone, mobile phone, standard telephone, or any device capable of receiving audio or speech and communicating with a network, which may be directly or indirectly through the plain old telephone system (POTS).

The collaboration server 10 receives at least one input media stream from the endpoints 20a-e. The input media stream may contain at least one of audio, video, file sharing, or configuration data. The collaboration server 10 combines the input media streams, either through transcoding or switching, into an output media stream. A transcoding conference bridge decodes the media stream from one or more endpoints and re-encodes a data stream for one or more endpoints. The conference bridge encodes a media stream for each endpoint including the media stream from all other endpoints. A switching conference bridge, on the other hand, transmits the video and/or audio of selected endpoint(s) to the other endpoints based on the active speaker. In the case of more than one active speaker, plural endpoints may be selected by the switching conference bridge.

The collaboration server 10 may also receive conference data from the endpoints 20a-e. The conference data may include any materials shared in the conference or the actual session information of the conference. Shared materials may include documents, presentation slides, spreadsheets, technical diagrams, or any material accessed from a shared desktop. The session information of the conference may include the title or participant listing, which includes the names of the endpoints 20a-e or the users of the endpoints 20a-e. Further, the shared material may reference. The conference data is sent from the collaboration server 10 to the speech recognition engine 50, which is discussed in more detail below.

Figure 2:
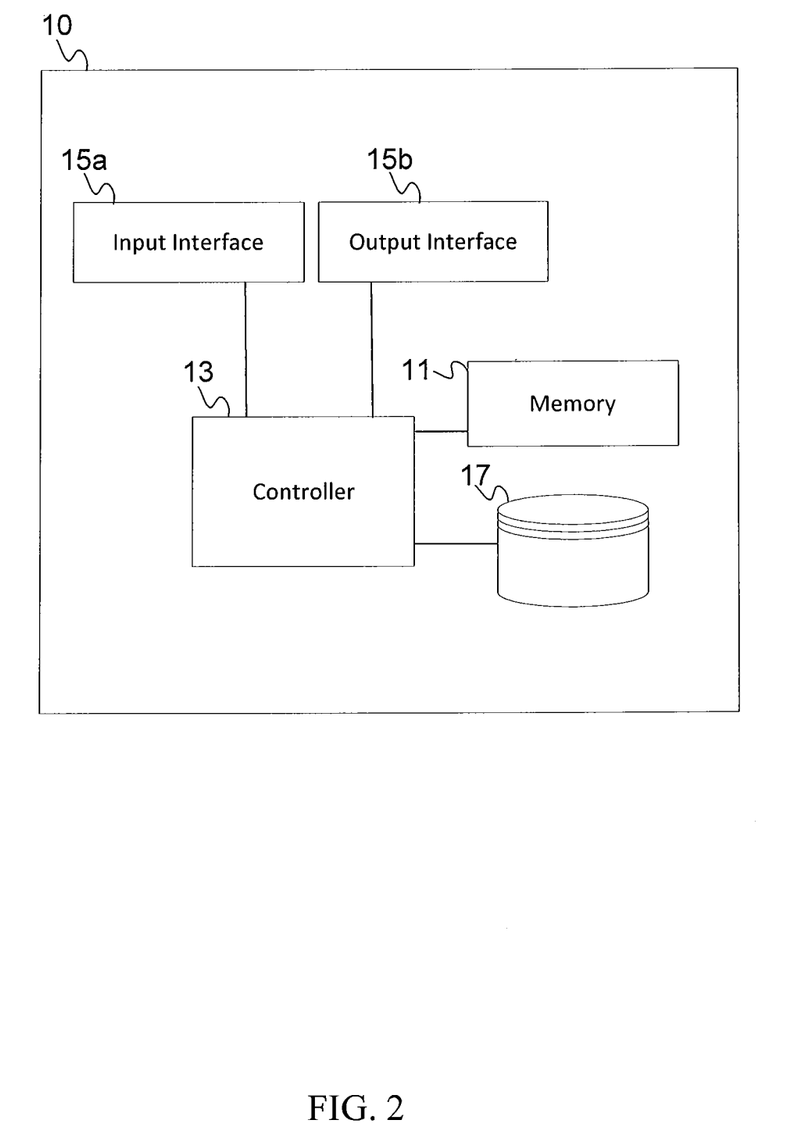
FIG. 2 illustrates an embodiment of a collaboration server.

FIG. 2 illustrates a more detailed view of the collaboration server 10. The collaboration server 10 includes a controller 13, a memory 11, a database 17, and a communications interface, including an input interface 15a and an output interface 15b. The input interface 15a receives input media streams and conference data from the endpoints 20a-e. The output interface 15b provides the output media stream to the endpoints 20a-e and provides the output media stream and the conference data to the speech recognition engine 50. Additional, different, or fewer components may be provided.

The controller 13 receives the conference data from the endpoints 20a-e, which are the conference participants. The collaboration server 10 obtains text associated with the conference data, which may simply involve parsing the text from the conference data. The memory 11 or database 17 stores the conference data. In one implementation, the conference data is uploaded to collaboration server 10 before the conference. In another implementation, the conference data is shared by one or more of the conference participants in real time.

Figure 3:
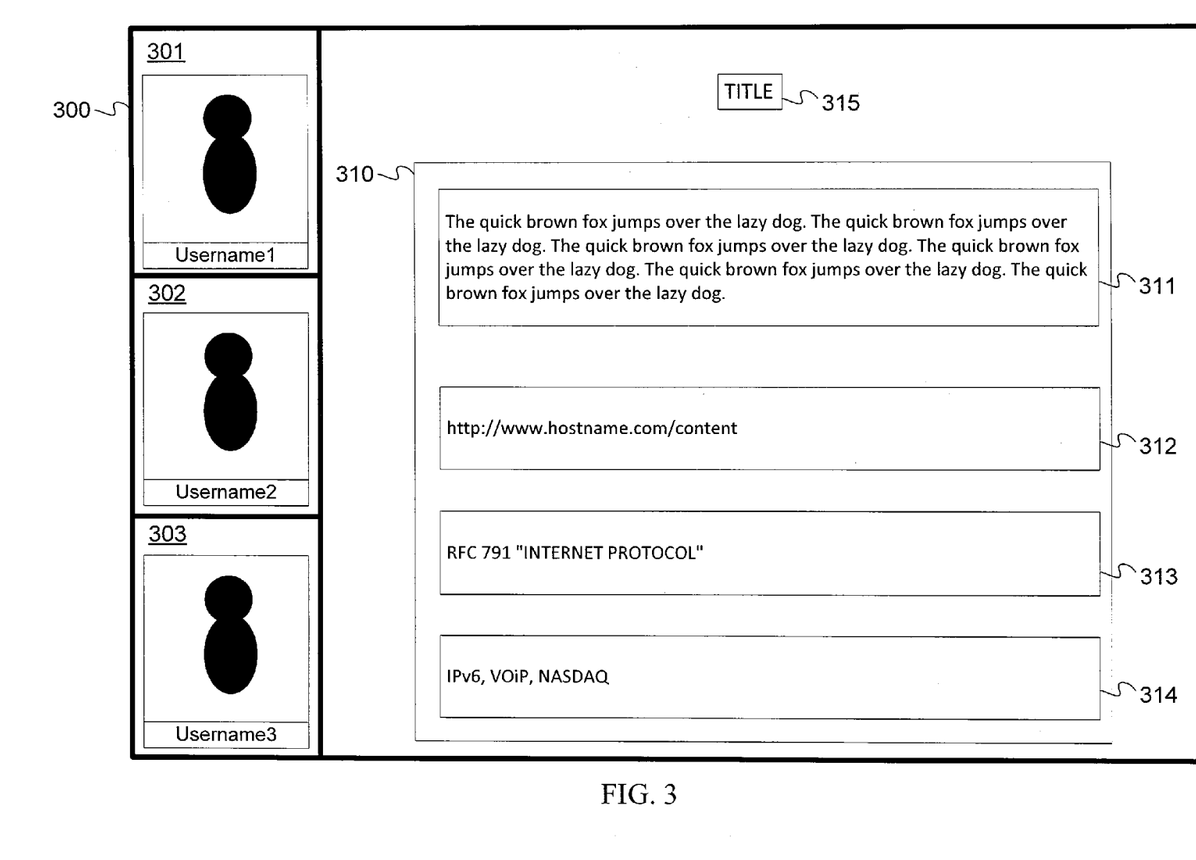
FIG. 3 illustrates conference data.

FIG. 3 illustrates a conference 300 of three conference participants, including a first participant 301, a second participant 302, and a third participant 303. Each of the conference participants may correspond to one of the endpoints 20a-e. Several implementations of the conference data sent from the collaboration server 10 to the speech recognition engine 50 are possible. The following examples may be included individually or in any combination.

A first example of conference data includes the names of the conference participants, which may be referred to as the conference roster. The username or the actual name of the conference participants are likely spoken during the conference. The conference roster may be static and sent to the speech recognition engine 50 before the conference begins. The conference roster may be updated as endpoints join and leave the conference, which involves sending the conference roster during the conference. The conference data may also include the title 315 of the conference 300. The collaboration server 10 may also detect who the current speaker or presenter is and include current speaker data in the conference data because a speaker is more likely to speak the names of other participants than speak the speaker's name or to use certain phrases.

A second example of conference data includes text parsed from shared material. Shared materials may include any file that can be accessed by any of the conference participants at the endpoints 20a-e. The shared material may be documents, presentation slides, or other materials, as represented by text 311. In one implementation, the shared materials are uploaded to database 17 before the conference begins. In the alternative or in addition, the collaboration server 10 can allow the endpoints 20a-e to share any information in real time. The shared materials may be shared over a network separate from the collaboration server 10, but accessible by the collaboration server 10. The raw text within the shared information may be directly extracted by controller 13. Alternatively, the controller 13 may "scrape" or take screen shots of the shared material and perform optical character recognition to obtain the text within the shared material.

A third example of conference data includes information from a link to a website or other uniform resource indicator (URL). The controller 13 may be configured to access an Internet or intranet location based on the URL 312 and retrieve relevant text at that location.

A fourth example of conference data includes information referenced by an industry standard 313. For example, the controller 13 may be configured to identify a standards document, such as RFC 791, which is referenced in the shared materials, title, or selected based on the roles of the participants. The controller 13 accesses the Internet or another database to retrieve text associated with the industry standard 313.

A fifth example of conference data includes acronym text 314. Some acronyms are particularly noteworthy because acronyms are often specific to particular fields and may be pronounced in a way not normally recognized by the language model. The acronyms may be part of text 311 but are illustrated separated because acronyms often include pronunciations that are not included in the default language model and are more likely to be used as headers or bullet points without any contextual reference.

A sixth example of conference data may include text from a chat window within the conference. The conference participants may chose to engage in a typed conversation that is related to the spoken content of the conference.

Figure 4:
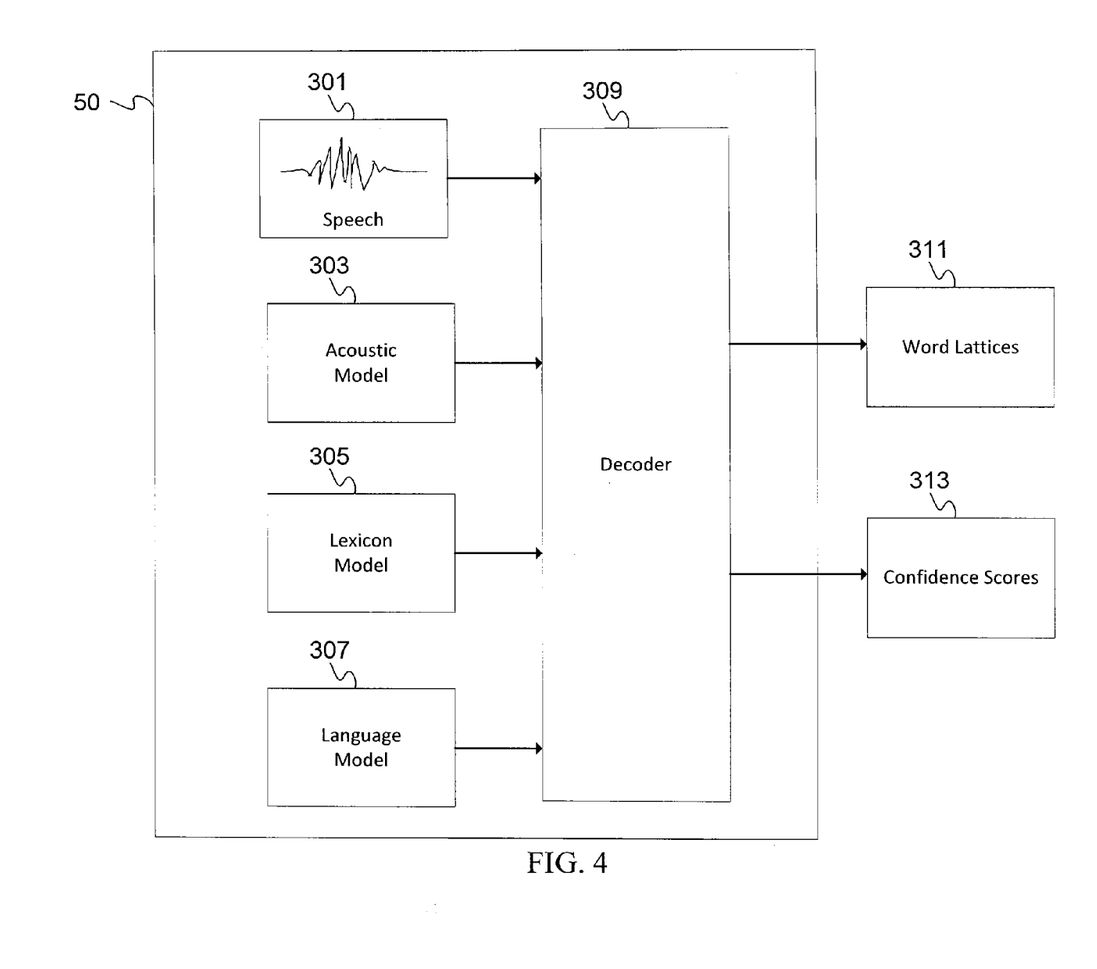
FIG. 4 illustrates an embodiment of a speech recognition engine.

FIG. 4 illustrates an embodiment of the speech recognition engine 50. In one embodiment, the speech recognition engine 50 and the collaboration server 10 may be combined into a single network device, such as a router, a bridge, a switch, or a gateway. In another embodiment, the speech recognition engine 50 may be a separate device connected to the collaboration server 10 via network 30f or the Internet. Alternatively, the functions of the speech recognition engine 50 may be performed using cloud computing.

The output media stream, including speech 301 is received at one or more endpoints 20a-e. A decoder 309 receives inputs from an acoustic model 303, a lexicon model 305, and a language model 307 to decode the speech. The decoder 309 coverts the speech 301 into text, which is output as word lattices 311. The decoder 309 may also calculate confidence scores 313, which may also be confidence intervals.

The speech 301 may be an analog or digital signal. The analog signal may be encoded at different sampling rates (i.e. samples per second—the most common being: 8 kHz, 16 kHz, 32 kHz, 44.1 kHz, 48 kHz and 96 kHz) and/or different bits per sample (the most common being: 8-bits, 16-bits or 32-bits). Speech recognition systems may be improved if the acoustic model was created with audio which was recorded at the same sampling rate/bits per sample as the speech being recognized.

One or more of the acoustic model 303, the lexicon model 305, and the language model 307 may be stored within the decoder 309 or received from an external database. The acoustic model 303 may be created from a statistical analysis of speech and human developed transcriptions. The statistical analysis involves the sounds that make up each word. The acoustic model 303 may be created from a procedure called "training." In training, the user speaks specified words to the speech recognition system. The acoustic model may be trained by others or trained by a participant. For example, each participant is associated with an acoustic model. The model for a given speaker is used. Alternatively, a generic model for more than one speaker may be used. The acoustic model 303 is optional.

The lexicon model 305 is a pronunciation vocabulary. For example, there are different ways that the same word may be pronounced. For example, the word "mirror" is pronounced differently in the New England states than in the southern United States. The speech recognition system identifies the various pronunciations using the lexicon model 305. The lexicon model 305 is optional.

The language model 307 defines the probability of a word occurring in a sentence. For example, the speech recognition system may identify speech as either "resident" or "president," with each possibility having equal likelihood. However, if the subsequent word is recognized as "Obama," the language model 307 indicates that there is a much higher probability that the earlier word was "president." The language model 307 may be built from textual data. The language model 307 may include a probability distribution of a sequence of words. The probability distribution may be a conditional probability (i.e., the probability of one word given another has occurred).

The language model 307 may be loaded with a default language model before receiving conference data from the collaboration server 10. The default language model, which may be referred to as a dictation data set, includes all possible or most vocabulary for a language. The speech recognition engine 50 may also identify the language of the conference by identifying the language of the presentation materials in the conference data, and select the default language model for the same language. The default language model may also be specialized. For example, the default language model could be selected from vocabularies designated for certain professions, such as doctors, engineers, lawyers, or bankers. In another example, the default language model could be selected based on dialect or geographic region. Regardless of the default language model used, the speech recognition engine 50 can improve the accuracy based on the conference data associated with the particular speech for transcription.

The language model 307 is updated by the speech recognition engine 50 by adjusting the probability distribution for words or sequences of words. In some cases, such as acronyms, new words are added to the language model 307, and in other cases the probability distribution may be lowered to effectively remove words from the language model 307. Probabilities may be adjusted without adding or removing.

The probability distribution may be calculated from n-gram frequency counts. An n-gram is a sequence of n items from another sequence. In this case, the n-grams may be a sequence of words, syllables, phonemes, or phones. A syllable is the phonological building block of a word. A phoneme is an even smaller building block. A phoneme may be defined as the smallest segmental unit of sound employed to differentiate utterances. Thus, a phoneme is a group of slightly different sounds which are all perceived to have the same function by speakers of the language or dialect in question. A phoneme may be a set of phones. A phone is a speech sound, which may be used as the basic unit for speech recognition. A phone may be defined as any speech segment that possesses the distinct physical or perceptual properties.

The n-gram frequency counts used in the language model 307 may be varied by the decoder 309. The value for n may be any integer and may change over time. Example values for n include 1, 2, and 3, which may be referred to as unigram, bigram, and trigram, respectively. An n-gram corpus is a set of n-grams that may be used in building a language model. Consider the phrase, "the quick brown fox jumps over the lazy dog." Word based trigrams include but are not limited to "the quick brown," "quick brown fox," "brown fox jumps," and "fox jumps over."

The decoder 309 may dynamically change the language model that is used. For example, when converting the speech of endpoint 20a, the controller 13 may calculate a confidence score of the converted text. The confidence score provides an indication of how likely it is that the text converted by the language model is accurate. The confidence score may be represented as a percentage or a z-score. In addition, the confidence scores may be calculated by decoder 309 on phonetic, word, or utterance levels.

The confidence score is measured from the probabilities that the converted text is accurate, which is known even if the actual text cannot be known. The speech recognition engine 50 compares the confidence scores to a predetermined level. If the confidence score exceeds the predetermined level, then the decoder 309 may continue to use the default language model. If the confidence score does not exceed the predetermined level, then the decoder 309 may update the language model 307 using the conference data. Alternatively, the decoder 309 may compare a confidence score of the transcription created using the default language model with a confidence score of the transcription created using the language model 307 updated with the conference data and select the best performing language model based on the highest confidence score. In other embodiments, the speech recognition engine 50 updates the language model 307 without analyzing confidence level.

One or more of the endpoints 20a-e may be a conference administrator. The endpoint that creates the conference (collaboration session) may be set as the conference administrator by default. The conference administrator may transfer this designation to another endpoint. The input interface 15a may also be configured to receive configuration data from the conference administrator. The configuration data may set a mode of the collaboration server 10 as either a cumulative mode or a single session mode. In the single session mode, the language model created or updated by the speech recognition engine 50 is not used in future conferences. The conference administrator or the conference system may recognize that the contents of the presentation during one conference may not improve the accuracy of transcription of future conferences.

In the cumulative mode, the controller 13 is configured to send a command to the speech recognition engine 50 to store the language model created or updated in a first conference for use in a second conference. The language model may be stored by either the collaboration server 10 or the speech recognition engine 50. The language model may be indexed by the conference administrator, one or more of the conference participants, or topic keywords. In addition, the language models may be indexed or associated with one another using an analysis of the conference data. For example, the conference data, including shared presentation materials of a current conference, may be compared to that of a past conference.

Figure 5:
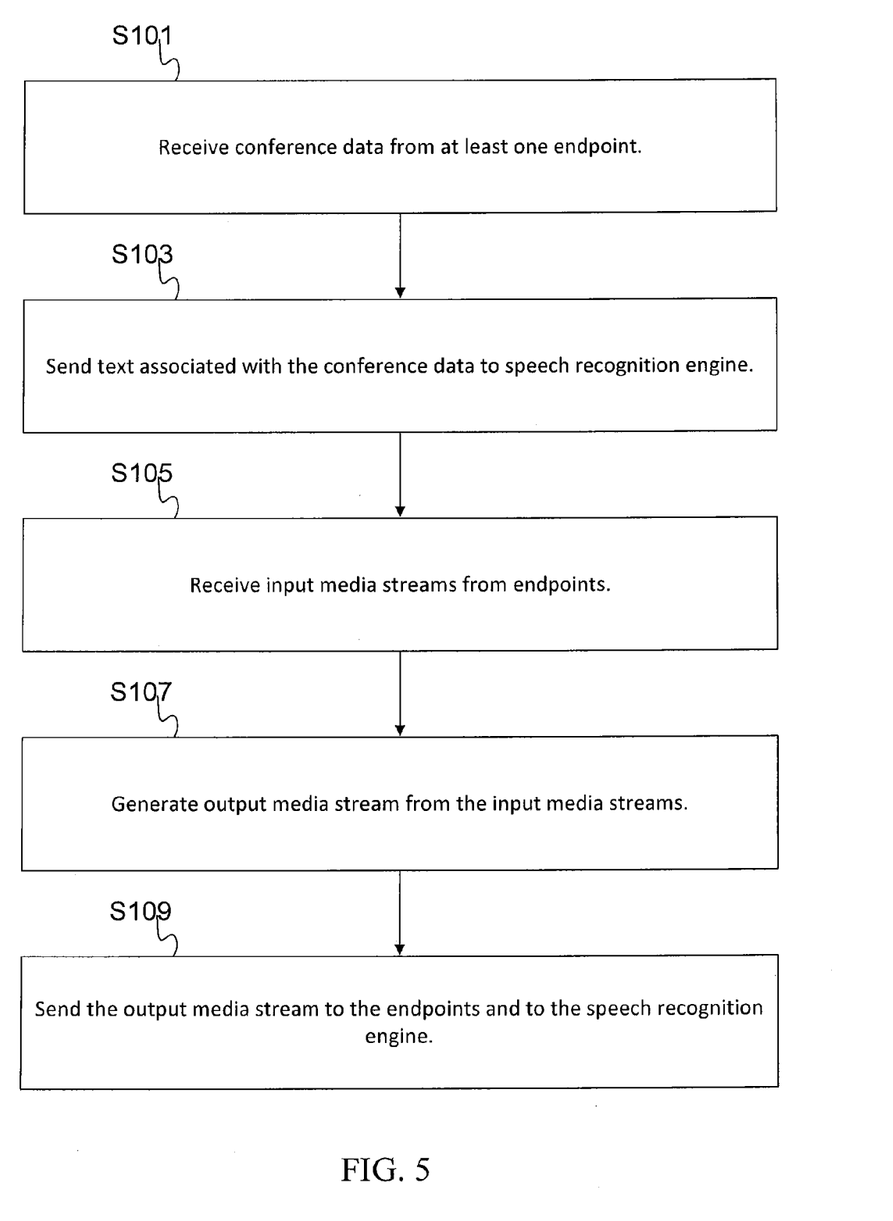
FIG. 5 illustrates a flow chart of a first embodiment of the conference system.

FIG. 5 illustrates a flow chart of a first embodiment of the conference system. In the first embodiment, the conference data is stored before the conference begins. The administrator inputs the conference data or links to the conference data. Alternatively or additionally, other participants input the conference data or associated links. In other embodiments, a processor mines for the information, such as identifying documents in common (e.g., authors, edits, and/or access) to multiple participants. This reduces the processing power needed because resources can be allocated to update the language model 307 at any time, and for a long duration, before the conference begins. The conference data may be stored in memory 11 or database 17 of the collaboration server 10, within the speech recognition engine 50, or in an external database. An incentive may be used to encourage the conference participants to submit presentation materials before the conference begins. The incentive may be in the form of a reduction of the price charged by the operator of the collaboration server or the network service provider. Alternatively, advance submission of the presentation materials may be required to receive a transcript of the conference or to receive the transcript without an additional charge.

At S101, the collaboration server 10 receives conference data from at least one endpoint 20a-e. In the case of the conference roster as the conference data, the collaboration server 10 generates the conference data in response to communication with at least one endpoint 20a-e. The collaboration server 10 may parse text from the conference data. At S103, the collaboration server 10 sends text associated with the conference data to the speech recognition engine 50.

At S105, after the transfer of conference data, the conference or collaboration session begins, and the collaboration server 10 receives input media streams from at least one of endpoints 20a-e. At S107, the collaboration server 10 generates an output media stream from the input media streams. At S109, the collaboration server 10 sends the output media stream to the endpoints 20a-e and to the speech recognition engine 50.

The speech recognition engine 50 performs transcription of the output media stream using the language model 307, which may be updated by the conference data. The transcript is sent back to the collaboration server 10 by the speech recognition engine 50. The transcript may include an indication for each word that was transcribed based on the conference data. The indication may include a URL link from the transcribed word to the appropriate location in the conference data. By seeing the affect of the conference data on the transcription produced by the language model 307, a user could approve or disapprove of particular updates to the language model 307, which may further improve the performance of the language model 307.

Figure 6:
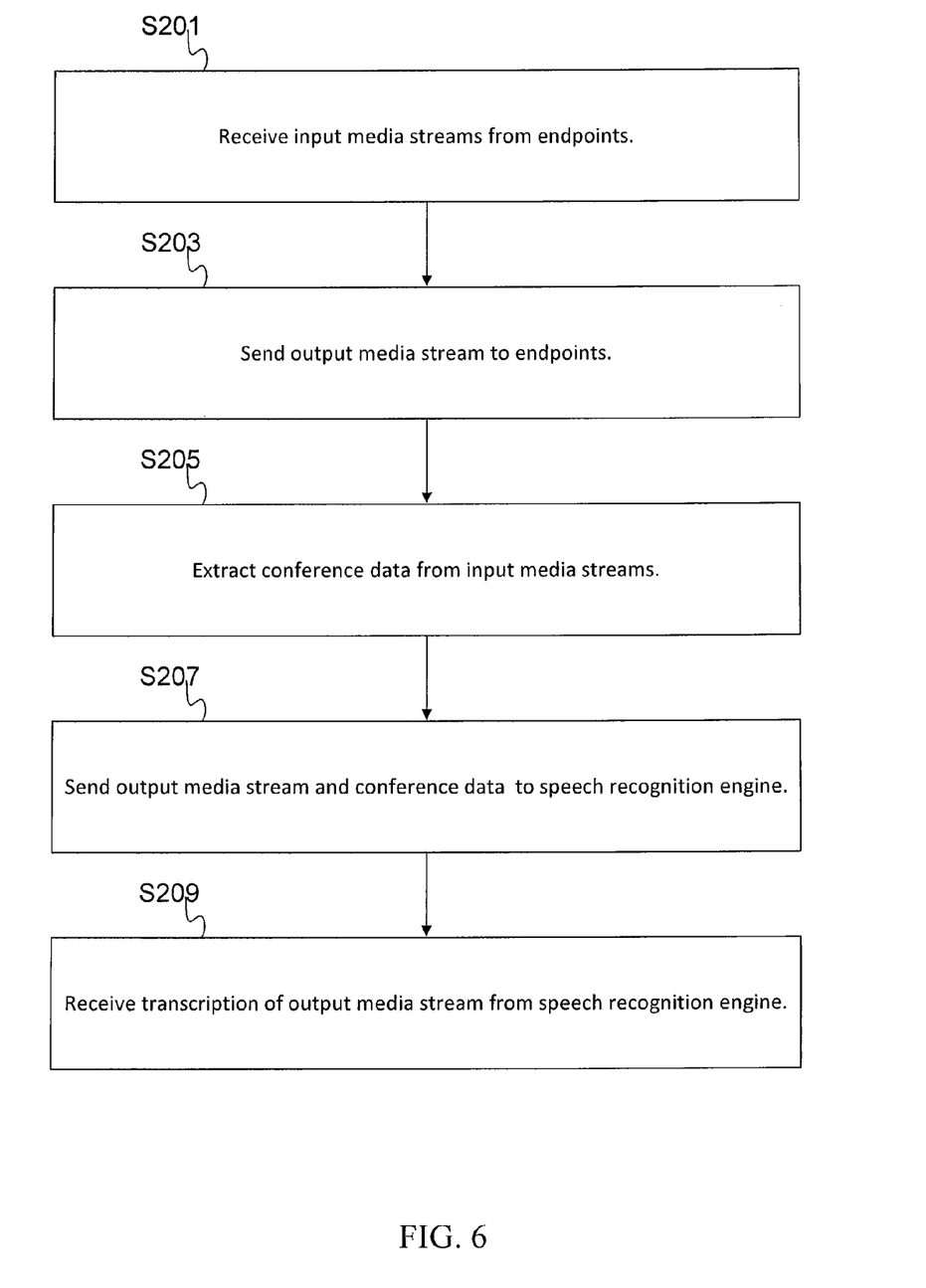
FIG. 6 illustrates a flow chart of a second embodiment of the conference system.

FIG. 6 illustrates a flow chart of a second embodiment of the conference system. In the second embodiment, the conference data is sent to the speech recognition engine 50 at or near the same time as the output media stream while the conference occurs. At S201, the collaboration server 10 receives input media streams from one or more of endpoints 20a-e. At S203, the collaboration server 10 sends the output media stream, which may be generated from a combination of the input media streams or simply selected as the active input media stream, to endpoints 20a-e.

At S205, the collaboration server 10 extracts conference data from the input media stream. The extract can either be a selection of text or an analysis of the shared image using optical character recognition (OCR) or a related technology. At S207, the collaboration server 10 sends the output media stream and the conference data to the speech recognition engine 50. The speech recognition engine 50 incorporates the conference data into a speech-to-text transcription process for the audio portion of the output media stream, which results in a transcript of at least a portion of the output media stream. At S209, the collaboration server 10 receives the transcript of at least a portion of the output media stream from the speech recognition engine 50. The collaboration server 10 may save the transcription in memory 11 or database 17 or send the transcription to the endpoints 20a-e.

The conference data may be limited by real time factors. For example, the conference data may include only the current slide of a presentation or the currently accessed document of the total shared materials. In another example, the conference data may be organized by topic so that the conference data includes only the pages deemed to be related to a specific topic. The speech recognition engine 50 may maintain a separate language model for each topic. In another example, the conference data may be organized by the contributor. In this case, the collaboration server 10 sends current speaker data to the speech recognition engine 50 that indicates the identity of the current speaker in the conference. The current speaker is matched with the portion of the conference data contributed by that particular speaker. The speech recognition engine 50 may maintain a separate language model for each endpoint or speaker.

Figure 7:
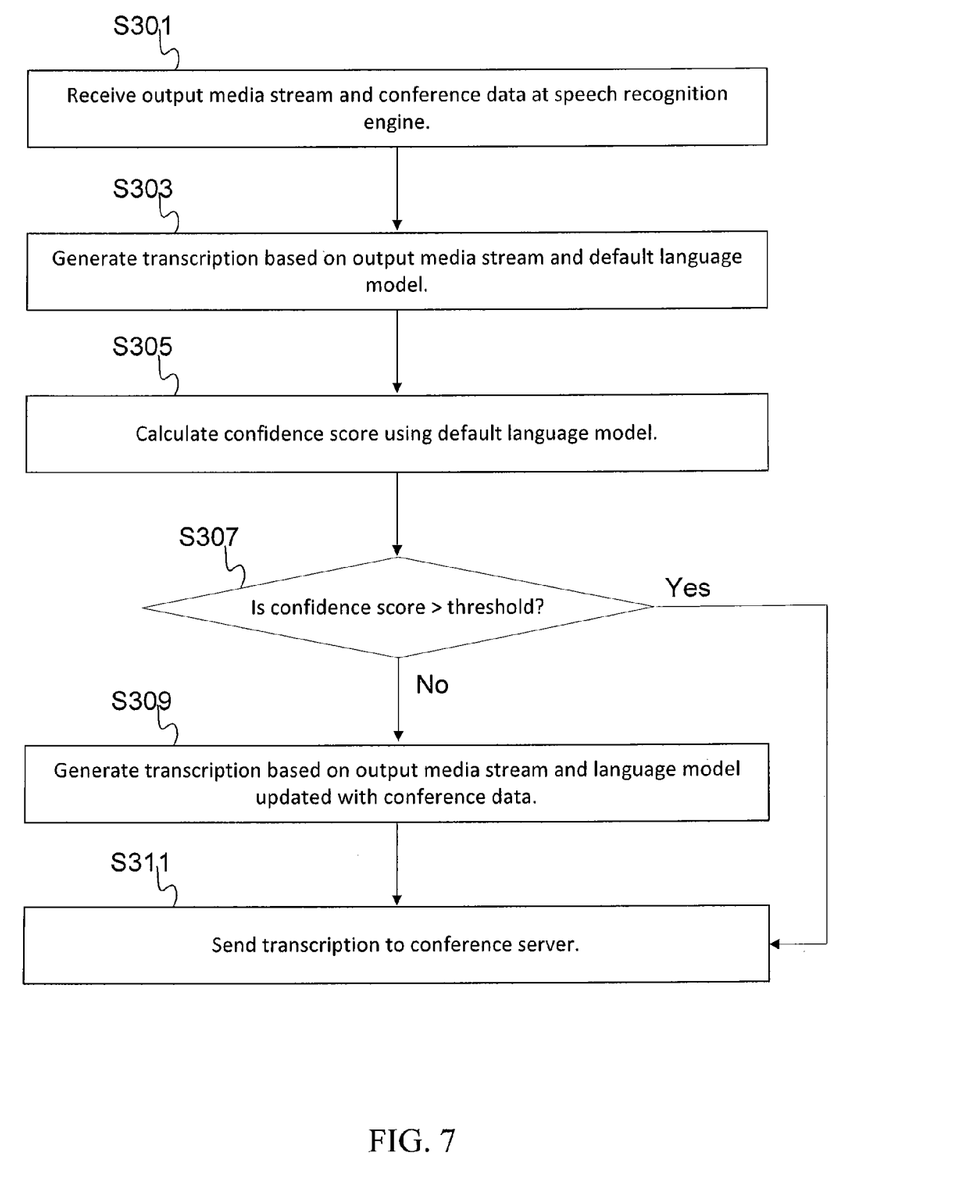
FIG. 7 illustrates a flow chart of an embodiment of the speech recognition engine.

FIG. 7 illustrates a flow chart of an embodiment of the speech recognition engine 50, which may be combined with any of the embodiments discussed above. At S301, the speech recognition engine 50 receives the output media stream and conference data from the collaboration server. The speech recognition engine 50 may initially perform speech recognition with the default language model. The default language model may be specific to the current speaker or the general topic of the conference. At S303, the speech recognition engine 50 generates a first transcription of at least a portion of the output media stream using the default language model.

At S305, the speech recognition engine 50 calculates a confidence score using the default language model. To calculate a confidence score, the speech recognition engine 50 does not need to know whether the transcription of a particular n-gram is correct. Instead, only the calculations involved in choosing the transcription may be needed. In another implementation, the first transcription may appear at one of the endpoints 20a-e, as communicated via collaboration server 10, and the conference participant may provide an input that indicates acceptance or rejection of the first transcription, which is relayed back to the speech recognition engine 50.

In either case, at S307, the speech recognition engine 50 determines whether the confidence score exceeds a threshold. The threshold may be 95%, 99% or another number. If the confidence score exceeds the threshold, the speech recognition engine 50 continues to use the default language model and send the first transcription to the collaboration server 10.

If the confidence score does not exceed the threshold, the speech recognition engine 50 updates the language model 307 based on the conference data. At S309, after the language model 307 has been updated, the speech recognition engine 50 generates a second transcription based on the output media stream and updated language model. At S311, the second transcription is sent to the collaboration server 10. Even though the terms first transcription and second transcription are used, the first transcription and the second transcription may be associated with the same or different portions of the output media stream. In this way, a transcript of the conference is created that can be text searched, which allows quick reference to particular points or discussions that occurred during the conference.

Referring back to the conference server 10 of FIG. 2, the memory 11 may be any known type of volatile memory or a non-volatile memory. The memory 11 may include one or more of a read only memory (ROM), dynamic random access memory (DRAM), a static random access memory (SRAM), a programmable random access memory (PROM), a flash memory, an electronic erasable program read only memory (EEPROM), static random access memory (RAM), or other type of memory. The database 17 may be external to the conference server 10 or incorporated within the conference server 10. The database 17 may be stored with memory 11 or separately. The database 17 may be implemented as either hardware or software.

The memory 11 may store computer executable instructions. The controller 13 may execute computer executable instructions. The computer executable instructions may be included in computer code. The computer code may be stored in the memory 11. The computer code may be written in any computer language, such as C, C++, C#, Java, Pascal, Visual Basic, Perl, HyperText Markup Language (HTML), JavaScript, assembly language, extensible markup language (XML) and any combination thereof.

The computer code encoded in one or more tangible media or one or more non-transitory tangible media for execution by the controller 13. Computer code encoded in one or more tangible media for execution may be defined as instructions that are executable by the controller 13 and that are provided on the computer-readable storage media, memories, or a combination thereof. Instructions for instructing a network device may be stored on any logic. As used herein, "logic" includes but is not limited to hardware, firmware, software in execution on a machine, and/or combinations of each to perform a function(s) or an action(s), and/or to cause a function or action from another logic, method, and/or system. Logic may include, for example, a software controlled microprocessor, an ASIC, an analog circuit, a digital circuit, a programmed logic device, and a memory device containing instructions.

The instructions may be stored on any computer readable medium. A computer readable medium may include, but is not limited to, a floppy disk, a hard disk, an application specific integrated circuit (ASIC), a compact disk CD, other optical medium, a random access memory (RAM), a read only memory (ROM), a memory chip or card, a memory stick, and other media from which a computer, a processor or other electronic device can read.

The controller 13 may include a general processor, digital signal processor, application specific integrated circuit, field programmable gate array, analog circuit, digital circuit, server processor, combinations thereof, or other now known or later developed processor. The controller 13 may be a single device or combinations of devices, such as associated with a network or distributed processing. Any of various processing strategies may be used, such as multi-processing, multi-tasking, parallel processing, remote processing, centralized processing or the like. The controller 13 may be responsive to or operable to execute instructions stored as part of software, hardware, integrated circuits, firmware, microcode or the like. The functions, acts, methods or tasks illustrated in the figures or described herein may be performed by the controller 13 executing instructions stored in the memory 11. The functions, acts, methods or tasks are independent of the particular type of instructions set, storage media, processor or processing strategy and may be performed by software, hardware, integrated circuits, firmware, micro-code and the like, operating alone or in combination. The instructions are for implementing the processes, techniques, methods, or acts described herein.

The I/O interface(s) 15a-b may include any operable connection. An operable connection may be one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other or through one or more intermediate entities (e.g., processor, operating system, logic, software). Logical and/or physical communication channels may be used to create an operable connection. For example, the I/O interface(s) 15a-b may include a first communication interface devoted to sending data, packets, or datagrams and a second communication interface devoted to receiving data, packets, or datagrams. Alternatively, the I/O interface(s) 15a-b may be implemented using a single communication interface.

Referring to FIG. 1, the communication paths 30a-e may be any protocol or physical connection that is used to couple a server to a computer. The communication paths 30a-e may utilize Ethernet, wireless, transmission control protocol (TCP), internet protocol (IP), or multiprotocol label switching (MPLS) technologies. As used herein, the phrases "in communication" and "coupled" are defined to mean directly connected to or indirectly connected through one or more intermediate components. Such intermediate components may include both hardware and software based components.

Referring to FIG. 4, the speech recognition engine 50 may be implemented using the conference server 10. Alternatively, the speech recognition engine 50 may be a separate device, which is a computing or network device, implemented using components similar to that of controller 13, memory 11, database 17, and communication interface 15.

Various embodiments described herein can be used alone or in combination with one another. The foregoing detailed description has described only a few of the many possible implementations of the present invention. For this reason, this detailed description is intended by way of illustration, and not by way of limitation.

We claim:

1. A method comprising:
receiving, with a collaboration server device hosting a current conference for a plurality of conference participants, conference data from at least one of the plurality of conference participants, the conference data comprising a shared material that is shared among the plurality of conference participants during the current conference and that includes data indicative of words or phrases discussed among the plurality of conference participants during the current conference when referencing the shared material, the shared material being other than data identifying the conference participants and other than audio generated during the current conference;
after receiving the shared material, sending, with the collaboration server device, the words or phrases of the shared material to a speech recognition engine to update a language model of the speech recognition engine with the words or phrases in order to improve an accuracy of a transcription of an output media stream of the current conference generated by the speech recognition engine upon receiving the output media stream;
receiving, with the collaboration server device, a plurality of input media streams from the plurality of conference participants generated during the current conference;
generating, with the collaboration server device, the output media stream from the plurality of input media streams;
sending, with the collaboration server device, the output media stream to the speech recognition engine for generation of the transcription of the output media stream using the updated language model;
receiving, with the collaboration server device, from one of the plurality of conference participants, mode data indicating whether the updated language model is to be used for only the current conference or also for a future conference; and
when the mode data indicates that the updated language model is to be used also for the future conference, sending, with the collaboration server device, a command to the speech recognition engine, the command indicating to the speech recognition engine to store the updated language model for the future conference.

2. The method of claim 1, wherein the shared material includes a document, a slide show, a spreadsheet, a diagram, or a website.

3. The method of claim 1, wherein the conference data further comprises a conference roster that includes names of the plurality of conference participants.

4. The method of claim 1, wherein sending the words or phrases to the speech recognition engine comprises sending, with the collaboration server device, the words or phrases to the speech recognition engine before sending the output media stream to the speech recognition engine.

5. The method of claim 1, further comprising:
receiving, with the collaboration server device, the transcription from the speech recognition engine, wherein the transcript was created using the updated language model.

6. The method of claim 5, further comprising:
sending, with the collaboration server device, the transcription received from the speech recognition engine to a conference participant of the plurality of conference participants when the conference participant sent at least part of the shared material prior to or during the current conference.

7. The method of claim 1, wherein the speech recognition engine determines a confidence score of the transcription generated with the updated language model to determine that the language model updated with the words or phrases generates a more accurate transcription than a default language model initially set for use with the current conference.

8. The method of claim 1, wherein the conference data further includes chat data typed into a chat window by at least one of the plurality of conference participants during the current conference, the chat data being on topic with the words or phrases from the shared material discussed during the current conference.

9. The method of claim 1, wherein sending the words or phrases to the speech recognition engine comprises sending, with the collaboration server device, the words or phrases to the speech recognition engine prior to commencement of the current conference.

10. The method of claim 1, wherein sending the words or phrases comprises sending, with the collaboration server device, words or phrases of a portion of the shared material that is currently being presented during the current conference.

11. The method of claim 1, wherein the updated language model, when stored in response to the command, is indexed according to at least one of: a conference topic, one or more conference participants, a conference topic keyword, or a comparison of the shared material shared during the current conference with prior shared material shared during a prior conference.

12. A collaboration server device comprising:
a memory storing conference data associated with a current conference received from at least one of a plurality of conference participants, the conference data comprising a shared material that is shared among the plurality of conference participants during the current conference and that includes data indicative of words or phrases discussing among the plurality of conference participants during the current conference when referencing the shared material, the shared material being other than data identifying the conference participants and other than audio generated during the current conference;
a collaboration server controller configured to:
host the current conference and allow the shared material to be shared among the plurality of conference participants during the current conference;
obtain words or phrases from the shared material stored in the memory;
generate an output media stream from a plurality of input media streams received from the plurality of conference participants;
send, via a communication interface, the output media stream and the words or phrases to a speech recognition engine to update a language model of the speech recognition engine with the words or phrases in order to improve an accuracy of a transcription of the output media stream generated by the speech recognition engine;
receive mode data indicating to store the updated language model for a future conference; and
in response to the mode data indicating to store the updated language model for a future conference, index the updated language model by conference topic with one or more prior language models based on a comparison of the shared material shared during the current conference with prior shared material shared during one or more prior conferences,
wherein the memory is configured to store the updated language model according to the index.

13. The collaboration server device of claim 12, wherein the collaboration server controller, via the communication interface, is further configured to send the output media stream to the plurality of conference participants.

14. The collaboration server device of claim 12, wherein the transcription comprises an initial transcription of the output media stream generated using a default language model.

15. The collaboration server device of claim 14, wherein the speech recognition engine calculates a confidence score based on the second transcription and updates the default language model with the words or phrases to generate the updated language model in response to the confidence score not exceeding a predetermined threshold.

16. The collaboration server device of claim 12, wherein the shared material comprises shared presentation material from at least one of the plurality of conference participants.

17. The collaboration sever device of claim 12, wherein the communication interface is configured to send the words or phrases to the speech recognition engine before the output media stream is sent to the speech recognition engine.

18. The apparatus of claim 12, wherein the collaboration server controller, via the communication interface, is configured to send the words or phrases obtained from the shared material to the speech recognition data prior to receipt of the plurality of input media streams generated during the current conference.

19. A non-transitory computer readable storage medium comprising computer-executable instructions comprising:
instructions executable by a collaboration server device hosting a current conference to receive shared data that is shared among a plurality of conference participants during the current conference, the shared data received from at least one of the plurality of conference participants and including data indicative of words or phrases discussed among the plurality of conference participants during the current conference when referencing the shared data and being other than data identifying the conference participants and other than audio generated during the current conference;
instructions executable by the collaboration server device to extract the words or phrases from the shared data;
instructions executable by the collaboration server device to send the words or phrases to a speech recognition engine to update a default language model with the words or phrases in order to improve an accuracy of a transcription of an output media stream from the current conference;
instructions executable by the collaboration server device to receive from one of the plurality of conference participants mode data indicating whether the updated language model is to be used for only the current conference or also for a future conference; and instructions executable by the collaboration server device to send a command to the speech recognition engine when the mode data indicates that the updated language model is to be used also for the future conference, the command indicating to the speech recognition engine to store the updated language model for the future conference.

20. The non-transitory computer readable storage medium of claim 19, further comprising:
instructions executable by the speech recognition engine to transcribe a media stream from the current conference to generate a transcription using the updated language model;
instructions executable by the speech recognition engine to transcribe the portion of the media stream from the current conference using the default language model;
instructions executable by the speech recognition engine to calculate a first confidence interval using the default language model;
instructions executable by the speech recognition engine to calculate a second confidence interval using the updated language model; and
instructions executable by the speech recognition engine to compare the first confidence interval and the second confidence interval to determine whether the updated language model is a better language model than the default language model for generation of the transcription of the output media stream.

* * * * *